(12) United States Patent
Heuver

(10) Patent No.: US 8,348,802 B2
(45) Date of Patent: Jan. 8, 2013

(54) TRANSMISSION CLUTCH ASSEMBLY

(75) Inventor: Bradley R. Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 747 days.

(21) Appl. No.: 12/433,015

(22) Filed: Apr. 30, 2009

(65) Prior Publication Data
US 2010/0279810 A1   Nov. 4, 2010

(51) Int. Cl.
F16H 57/08 (2006.01)
F16D 25/0638 (2006.01)

(52) U.S. Cl. .................. 475/331; 192/85.45

(58) Field of Classification Search .......... 475/331; 192/85.39, 85.45, 85.46
See application file for complete search history.

(56) References Cited

U.S. PATENT DOCUMENTS

| | | | |
|---|---|---|---|
| 2,804,780 A * | 9/1957 | Gerst | 74/360 |
| 2,825,236 A | 3/1958 | Nabstedt et al. | |
| 3,384,214 A | 5/1968 | Wilson | |
| 3,436,986 A * | 4/1969 | Lawrence | 475/131 |
| 4,724,941 A * | 2/1988 | Wirkner | 192/52.2 |
| 5,630,339 A | 5/1997 | Tuday | |
| 5,752,810 A | 5/1998 | Hein | |
| 5,884,739 A * | 3/1999 | Constantin | 192/35 |
| 5,899,306 A | 5/1999 | Sakai et al. | |
| 6,116,392 A * | 9/2000 | Gassmann | 192/35 |
| 7,104,378 B2 | 9/2006 | Martin | |
| 7,246,693 B2 | 7/2007 | Portell et al. | |
| 7,350,633 B2 * | 4/2008 | Portell et al. | 192/85.29 |
| 8,123,014 B2 * | 2/2012 | Wooden | 192/48.613 |
| 2006/0169566 A1 | 8/2006 | Egawa | |

* cited by examiner

*Primary Examiner* — Roger Pang

(74) *Attorney, Agent, or Firm* — James Dottavio; Just Intellectuals, PLLC

(57) ABSTRACT

The present disclosure relates to a piston-actuated clutch assembly for a transmission. Interconnecting members are integrated into a pressure plate of the clutch assembly. The interlocking members are configured to selectively interlock the piston and the pressure plate. The location of the interlocking members reduces wear on the piston and other transmission components.

15 Claims, 4 Drawing Sheets

TRANSMISSION CLUTCH ASSEMBLY

TECHNICAL FIELD

The present inventions relate to a clutch assembly for an automobile transmission, more specifically, to a piston-pressure plate connection in the clutch assembly.

BACKGROUND

Conventional automobile transmissions include various clutch assemblies that enable the transmission to power the wheels at different speeds. Clutch assemblies are typically hydraulically actuated using some sort of apply piston. In past arrangements pistons have included pins that connect the piston with a backing plate of the clutch assembly. These pins interface with the backing plate carrying the force or load of engagement when applied. Concentrated over a relatively small surface area, these forces can cause unwanted wear on the piston and pins.

Additionally in certain sections of the transmission—typically near the output shaft of the transmission—the apply pistons can neighbor other transmission components such as speed sensors and park pawls. Accordingly, it can be desirable to restrict the rotational range of movement of the piston in order to ensure that the piston does not disrupt other transmission components when applying the clutch. Very high forces can develop when the piston is directly tied to the transmission case. These forces can cause unwanted wear and brinelling on the piston and neighboring transmission components.

Therefore, it is desirable to have a clutch assembly for a transmission that includes interconnecting members that produce less wear on the piston and other transmission components. It is also desirable to provide a method of manufacturing the clutch assembly that is cost efficient.

SUMMARY

The present inventions may address one or more of the above-mentioned issues. Other features and/or advantages may become apparent from the description which follows.

Certain embodiments of the present inventions provide a piston-actuated clutch assembly for a transmission, including: a clutch pack having a plurality of friction plates; a pressure plate at one end of the clutch pack; a piston adjacent the pressure plate; and interconnecting members integrated into the pressure plate, configured to selectively interlock the piston and the pressure plate during transmission operation. The piston is configured to actuate the clutch pack.

Other exemplary embodiments of the present inventions include a vehicle transmission, having: a housing; a hydraulically actuable clutch pack having a plurality of friction plates configured to selectively engage a planetary gear set; a pressure plate at one end of the clutch pack; a piston adjacent the pressure plate; and interconnecting members integrated into the pressure plate, configured to selectively interlock the piston and the pressure plate during transmission operation.

Another exemplary embodiment of the present inventions includes a method of manufacturing a clutch assembly for a transmission with reduced wear. The method includes: forming a piston; forming at least one receiving member in the piston; forming a pressure plate configured to selectively engage the piston; and forming an interconnecting member attached to the pressure plate and matable with the receiving member.

One advantage of some of the techniques discussed in the present disclosure is that they reduce wear in the transmission. There is less force in the apply piston and less wear on the piston and neighboring transmission components.

Another advantage of the present teachings is that they provide an inexpensive method of manufacturing a transmission with clutch assembly having reduced wear and greater durability.

In the following description, certain aspects and embodiments will become evident. It should be understood that the inventions, in their broadest sense, could be practiced without having one or more features of these aspects and embodiments. It should be understood that these aspects and embodiments are merely exemplary and explanatory and are not restrictive of the inventions.

The inventions will be explained in greater detail below by way of example with reference to the figures, in which the same references numbers are used in the figures for identical or essentially identical elements. The above features and advantages and other features and advantages of the present inventions are readily apparent from the following detailed description of the best modes for carrying out the inventions when taken in connection with the accompanying drawings. In the figures:

Figure 1:
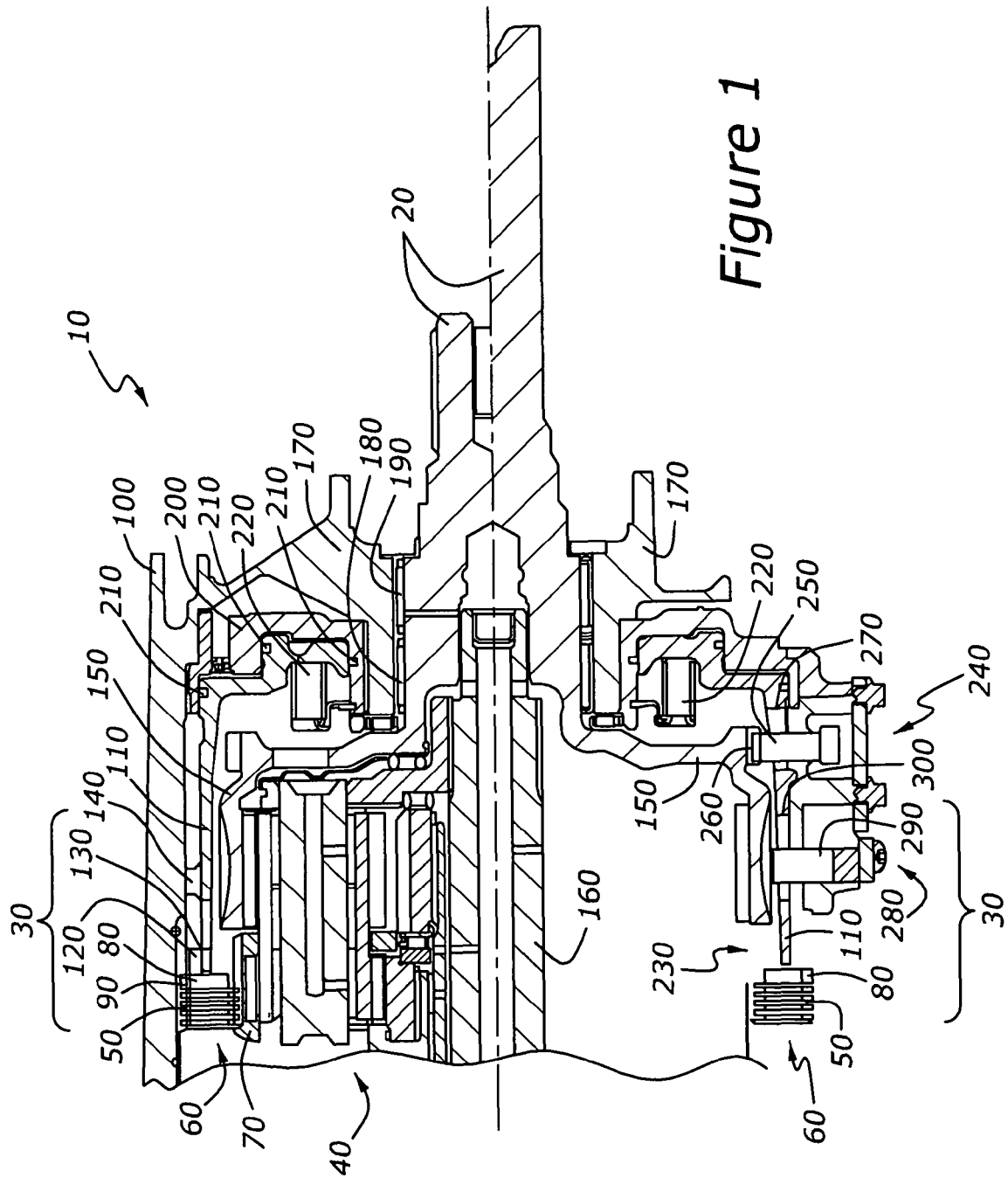
FIG. 1 is a partial cross-sectional view of a vehicle transmission with a clutch assembly according to an exemplary embodiment of the present inventions.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, FIGS. 1-5, wherein like characters represent the same or corresponding parts throughout the several views there is shown various transmission clutch assemblies. The clutch assemblies include a pressure plate that is engaged by a hydraulic apply piston. There are any number of interconnecting members formed in the pressure plate between the plate and piston to selectively interlock the piston and pressure plate. The placement and configuration of the interconnecting members yields greater durability and less wear on the piston and other transmission components.

Referring now to FIG. 1, there is shown therein a partial cross-sectional view of an automobile transmission 10. This cross-section shows the rear section of the transmission 10 or the section closest an output shaft 20 of the transmission. The shown transmission 10 is a six speed transmission. An exemplary piston-actuated clutch assembly 30 shown in FIG. 1 is configured to selectively engage a planetary gear set 40. The shown gear set 40 and clutch pack 50 enables the transmission 10 to operate in neutral, a first speed and reverse. In this manner the clutch assembly 30 is sometimes referred to as a low-reverse clutch assembly.

Clutch assembly 30, as shown in FIG. 1, includes a hydraulically actuable clutch pack 50 having five clutch or friction plates 60 that selectively engage the ring or carrier gear 70 of the planetary gear set. A pressure plate 80 is located at one end of the clutch pack 50. The pressure plate 80 has a series of splines 90 on an outer surface; pressure plate 80 is splined to and engages a transmission housing 100. The splines 90 engage the transmission housing 100 and substantially prevent the pressure plate 80 from rotating. Pressure plate 80 is configured to move axially, transferring pressure to the friction plates 60 and enabling friction plates to engage the gear set 40. Pressure plate 80 is actuated by an apply piston 110. Pressure plate 80 includes several interconnecting members 120 attached to the pressure plate. Interconnecting members 120 are configured to engage the apply piston 110 and interlock the piston and pressure plate 80 when so engaged. Each interconnecting member 120 includes a chamfered edge. In the shown embodiment, interconnecting members 120 are rectangular and are integrally formed with the pressure plate 80.

Piston 110 is configured to apply pressure to the pressure plate 80 and actuate clutch pack 50. Piston 110 includes receiving members 130 that are matable with interconnecting members 120. In the illustrated embodiment of FIG. 1, receiving members 130 are slots or perforations at one end of the piston 110. Piston 110 also includes an alignment member 140 on an outer surface. Alignment member 140 assists in positioning piston 110, with respect to the transmission housing 100 during assembly. Alignment member 140 further partially prevents piston 110 from tilting with respect to the transmission housing 100. Alignment member 140 includes a chamfered edge. In the shown embodiment, alignment member 140 is integrally formed with the piston 110.

With reference to FIG. 1, piston 110 is journaled onto a hub 170 of the transmission 10. The output shaft 20 includes a ring gear 150 that is at least partially journaled onto an intermediate shaft 160 of the transmission. The transmission housing 100 includes hub 170 that is journaled onto the output shaft 20. Bearings 180, 190 are fitted between the transmission hub 170 and the output shaft 20. A cylinder 200 is in the transmission housing 100 between piston 110 and ring gear 150. Piston 110 is nested inside cylinder 200. Cylinder 200 includes a number of seals 210 to control fluid distribution between the piston 110 and cylinder. When the piston 110 is actuated fluid fills between cylinder 200 and piston to axially move piston toward pressure plate 80.

A set of annularly arranged coil springs 220 are fixed to the cylinder 200 and positioned against the piston 110. Springs 220 bias piston 110 toward cylinder 200. At rest, piston 110 is forced towards cylinder 200. When actuated the pressure applied by fluid travelling between the piston 110 and cylinder 200 must be greater than the force applied by the coil springs 220 and seal drag to actuate the clutch pack 50.

The bottom half of the transmission 10, illustrated in FIG. 1, shows the clutch assembly 30 in the off or inactive position. Piston 110 is not engaged with pressure plate 80 as shown at 230. A park lock mechanism 240 for the transmission 10 is located at the bottom of the transmission. The park lock mechanism 240 includes a park pawl 250 and a park gear 260. Due to the rearward position of clutch assembly 30, piston 110 is configured to accommodate transmission components located near the output shaft 20. The park lock mechanism 240 includes the park pawl 250 that engages the park gear 260 that is nested inside of piston 110. Park gear 260 is fixed to ring gear 150 of the output shaft 20. When the park pawl 250 engages gear 260 the output shaft 20 is substantially prevented from rotating. Piston 110 includes an orifice 270 through which park pawl 250 can fit. The orifice 270 is sufficiently large so that minor rotations of piston 110 do not cause the piston to touch or disrupt the park pawl 250.

In FIG. 1, there is also shown a speed sensing apparatus 280 for the transmission. Speed sensing apparatus 280 includes an arm 290 that has a sensor (not shown) mounted at and end of the arm. The sensor monitors the rotational speed of the output shaft 20 at ring gear 150. Piston 110 includes an orifice 300 through which the arm 290 of the speed sensing apparatus can fit. In the illustrated embodiment, piston 110 is therefore substantially prevented from rotating to accommodate the speed sensing apparatus 280 and the park lock mechanism 240.

Figure 2:
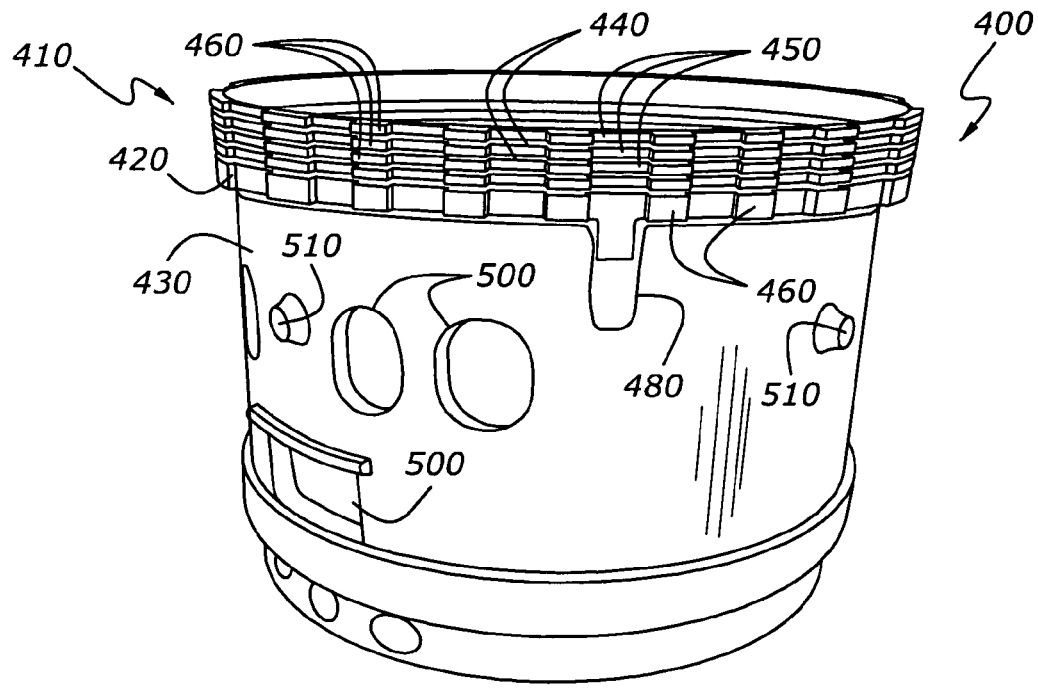
FIG. 2 is a perspective view of the clutch assembly of FIG. 1.
Figure 3:
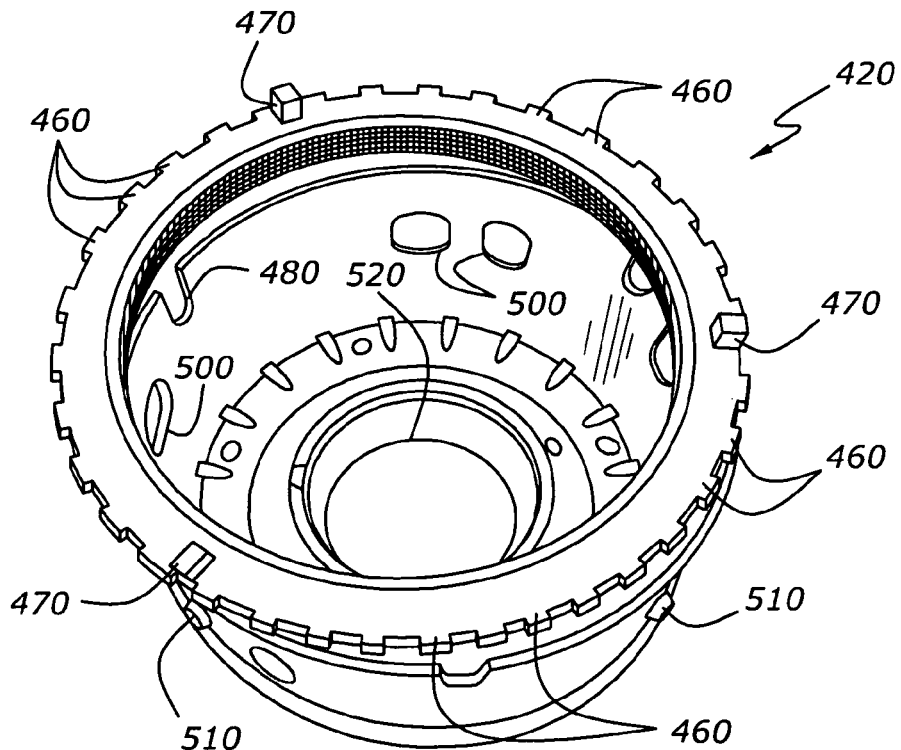
FIG. 3 is a perspective view of the pressure plate and interconnecting members of FIG. 2.
Figure 4:
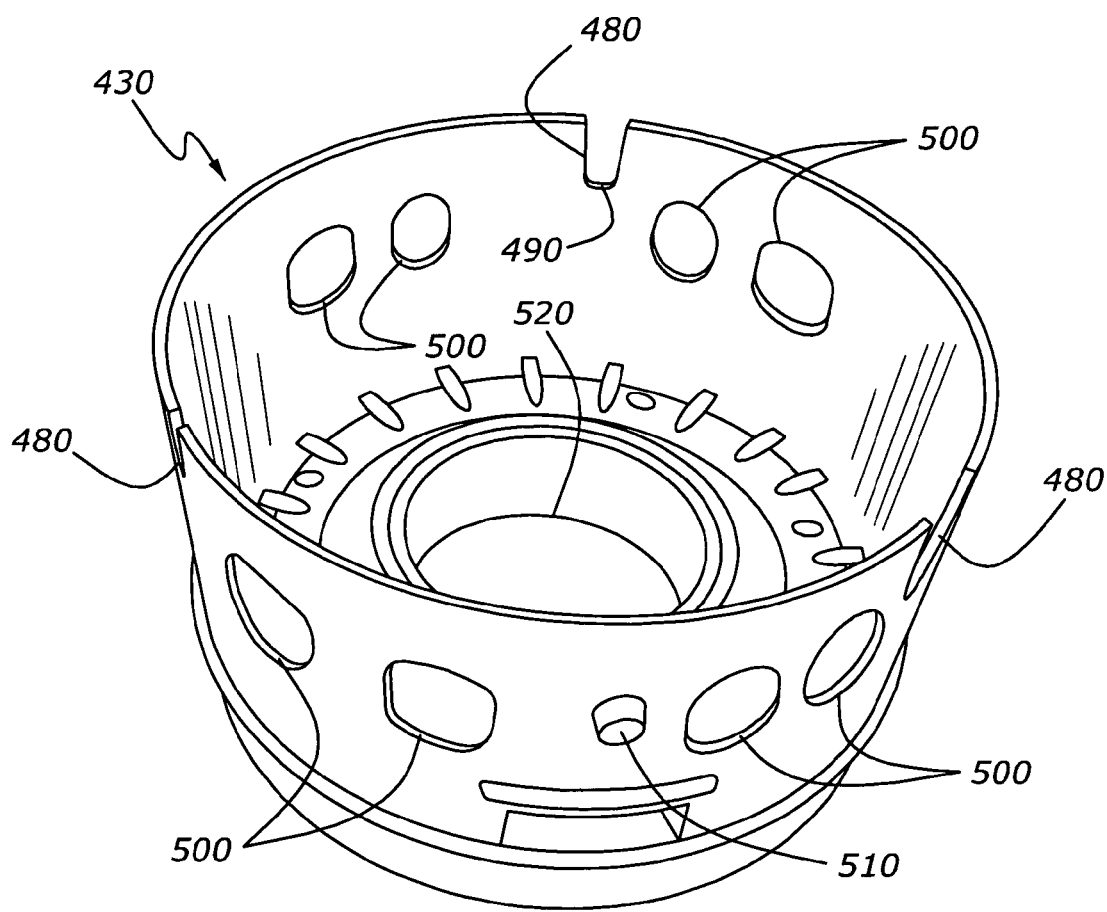
FIG. 4 is a perspective view of the piston of FIG. 2.

Referring now to FIGS. 2-4 a piston-actuated clutch assembly 400 is shown removed from a vehicle transmission housing. Specifically with reference to FIG. 2 there is shown therein a perspective view of a clutch assembly 400. The clutch assembly 400 is rotated 90 degrees clockwise from the operating position. Clutch assembly 400 includes a hydraulically actuable clutch pack 410, pressure plate 420 and piston 430. Clutch pack 410 includes several friction plates 440. Juxtaposed between each friction plate 440 are pressure plates 450. Pressure plates 450 have splines 460 on the outer surfaces of each plate. At the end of the clutch pack 410 is the pressure plate 420. Pressure plate 420 is thicker than plates 450. Pressure plate 420 also has a series of splines 460 on the outer surface. Pressure plate 420 is configured to engage piston 430.

As shown in FIG. 3, formed in the pressure plate 420 are three interconnecting members 470. Interconnecting members 470 interlock piston 430 and pressure plate 420. Members 470 prevent piston 430 from substantially rotating with respect to the transmission housing. Members 470 also properly align piston 430 with pressure plate 420 during engagement. In the shown embodiment, interconnecting members 470 are rectangular lugs. Interconnecting members 470 are chamfered on all five surfaces of the lug. The face of the lug 470 is chamfered with respect to the side surfaces; each side surface is respectively chamfered as well. The radius of chamfer can be, e.g., 30 degrees. Lugs 470 extend axially along one end of the pressure plate 420. Interconnecting members 470 are formed integrally with the pressure plate 420. In this embodiment, interconnecting members 470 are formed of powdered metal processes with the pressure plate. In other embodiments interconnecting members 470 are welded onto the face of pressure plate. Interconnecting members 470 are configured of a sufficient cross-sectional area to sustain forces from the piston 430. Since these interconnecting members 470 are formed on the pressure plate 420 and interconnect the piston to the housing 100 through the pressure plate, as opposed to directly connecting the piston 430 to the housing 100, the members undergo much less force during torque reversals.

Referring now to FIG. 4, there is shown therein a perspective view of the piston 430. Piston 430 includes three receiving members 480 that are matable with the interconnecting members 470 of the pressure plate 420 (as shown in FIG. 3). Receiving members 480 are axial slots located at the end of the piston. Slots 480 are designed to fit interconnecting members 470 therein. Slots 480 are longer than the interconnecting members 470 so that piston 430 does not necessarily engage interconnecting members 470 at surface 490 of piston. This allows a path for lube oil to exit the piston when the piston is applied. Slots 480 are also of a rectangular configuration. In one embodiment, slots 480 include chamfered or beveled edges to facilitate the interaction between interconnecting members and piston.

Also shown in FIG. 4 are several orifices 500 (or holes) in the body of the piston. These holes 500 can be used to accommodate non-rotating transmission components such as the park pawl 250 and speed sensor apparatus 280, as shown in FIG. 1. Piston 430 further includes protrusions 510 on the outer surface. Protrusions 510 act as alignment members or features for the piston. Alignment member 510 assists in positioning the piston 430 in the transmission housing during assembly. Alignment member 510 can also prevent the piston from tilting with respect to the housing. Piston 430 includes an orifice 520 at the other end to enable the output shaft to fit therethrough.

Figure 5:
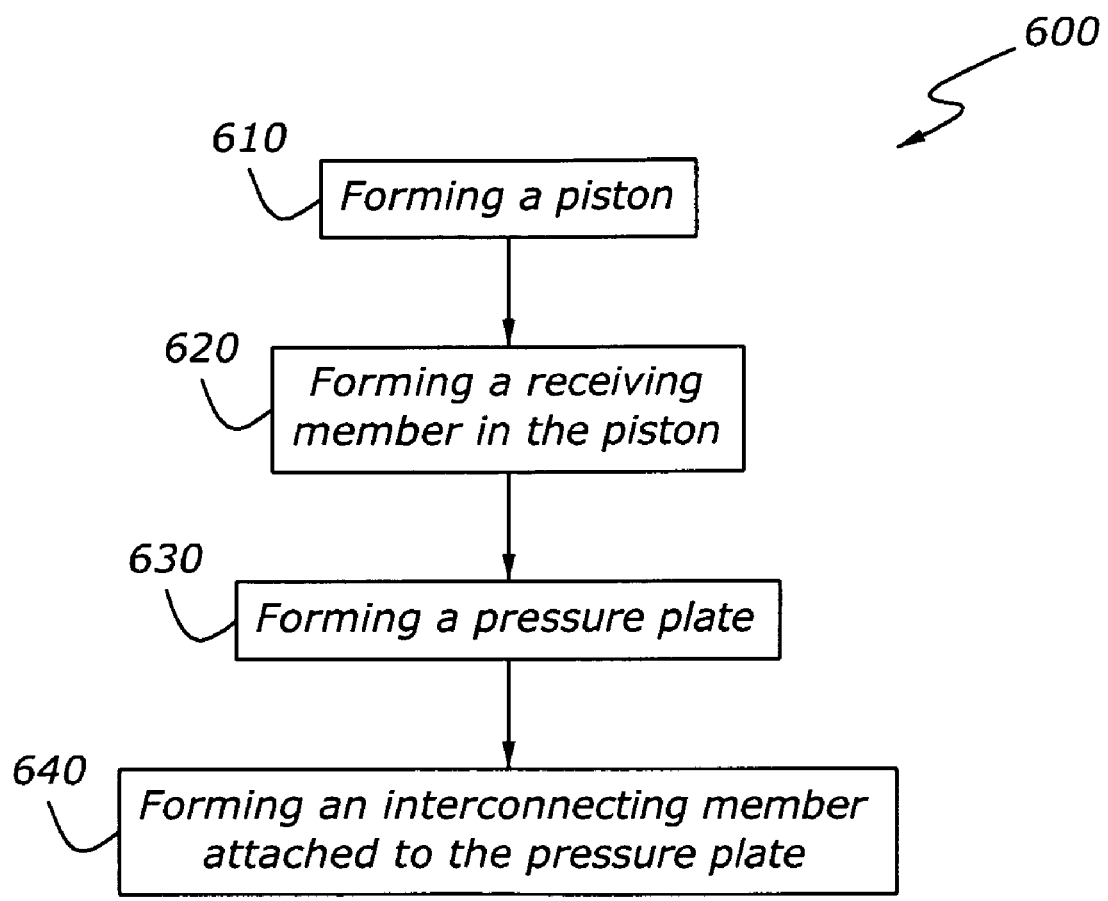
FIG. 5 illustrates a method of manufacturing a transmission according to another exemplary embodiment of the present inventions.

Referring now to FIG. 5, there is shown therein a method of manufacturing a transmission with reduced wear 600. The steps of the method include forming a piston 610. Piston can be formed using any number of forming techniques such as, e.g., die casting, machining, and extrusion. The next step is forming at least one receiving member in the piston 620. Receiving slot can be rectangular or any other shape. Forming a pressure plate configured to selectively engage the piston is also included in the method 630. Pressure plate can be formed using any number of forming techniques such as, e.g., die casting, machining, and extrusion. Also the method includes forming an interconnecting member attached to the pressure plate and matable with the receiving member 640. Interconnecting member can be rectangular or of any other shape that is compatible or matable with the receiving member. Interconnecting member can be formed using any number of forming techniques such as, e.g., die casting, machining, and extrusion. In one embodiment, the method includes forming a chamfer on an edge of the interconnecting member. Chamfer can be, for example, machined into the interconnecting member post casting or chamfer can be included in the mold cavity for the pressure plate.

In the shown embodiments the transmission housing, pressure plate, interconnecting members and piston are composed of an aluminum alloy. These components are formed via powder-metal processes, die casted and these components can also be machined, if needed. Any one of these components can be composed of other materials including, e.g., steel or titanium alloys.

Though the illustrated embodiments relate to clutch assemblies that selectively engage a pressure plate and piston, it should be appreciated that the disclosed interconnecting members and receiving members can be used for selective engagement of any number of transmission components. Moreover, interconnecting members and receiving members can be of any number of shapes including, circular and triangular configurations.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description or claims are approximations that can vary depending upon the desired properties sought to be obtained by the present inventions. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "an interconnecting member" includes two or more different interconnecting members. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the methodologies of the present disclosure without departing from the scope of its teachings. Other embodiments of the inventions will be apparent to those skilled in the art from consideration of the specification and practice of the teachings disclosed herein. It is intended that the specification and examples be considered as exemplary only.

While the best modes for carrying out the inventions have been described in detail, those familiar with the art to which these inventions relate will recognize various alternative designs and embodiments for practicing the inventions within the scope of the appended claims.

We claim:

1. A piston-actuated clutch assembly for a transmission, comprising:
 a clutch pack having a plurality of friction plates;
 a pressure plate at one end of the clutch pack;
 a piston adjacent the pressure plate; and
 interconnecting members integrated into the pressure plate, configured to selectively interlock the piston and the pressure plate during transmission operation;
 wherein the piston is configured to actuate the clutch pack.

2. The clutch assembly of claim 1, wherein the pressure plate includes a series of splines on an outer surface of the pressure plate, the splines configured to engage a transmission housing.

3. The clutch assembly of claim 1, wherein the interconnecting members are rectangular.

4. The clutch assembly of claim 3, wherein the interconnecting members include a chamfered edge.

5. The clutch assembly of claim 4, wherein the piston includes receiving members matable with the interconnecting members.

6. The clutch assembly of claim 1, further comprising:
 a cylinder, the piston at least partially nested inside of the cylinder;
 wherein the piston is spring biased towards the cylinder.

7. The clutch assembly of claim 1, wherein the piston includes a protrusion on an outer surface of the piston configured to position the piston with respect to a transmission housing.

8. A vehicle transmission, comprising:
 a housing;
 a hydraulically actuable clutch pack having a plurality of friction plates configured to selectively engage a planetary gear set;
 a pressure plate at one end of the clutch pack;
 a piston adjacent the pressure plate; and
 interconnecting members integrated into the pressure plate, configured to selectively interlock the piston and the pressure plate during transmission operation.

9. The transmission of claim 8, wherein the pressure plate includes a series of splines on an outer surface of the pressure plate, the splines configured to engage the housing.

10. The transmission of claim 8, wherein the planetary gear set is connected to an output shaft of the transmission and configured to rotate the output shaft in two directions.

11. The transmission of claim 8, wherein the interconnecting members are rectangular.

12. The transmission of claim 11, wherein the interconnecting members include a chamfered edge.

13. The transmission of claim 8, wherein the piston includes receiving slots matable with the interconnecting members.

14. The transmission of claim 8, further comprising:
 a cylinder, the piston at least partially nested inside of the cylinder;
 wherein the piston is spring biased towards the cylinder.

15. The transmission of claim 8, wherein the piston includes a protrusion on an outer surface of piston configured to position piston with respect to the housing.

* * * * *